United States Patent [19]
Kliott

[11] 3,726,731
[45] Apr. 10, 1973

[54] COMPOSITE MATERIALS PRODUCING SUSTAINED COLORED FLAMES

[75] Inventor: Leon Kliott, Hollywood, Fla.

[73] Assignee: LCP Scientific, Inc., Miami, Fla.

[22] Filed: Feb. 24, 1971

[21] Appl. No.: 118,473

[52] U.S. Cl. ..................................... 149/109, 149/2
[51] Int. Cl. ............................................. C06b 15/00
[58] Field of Search ..................... 149/17, 2, 109, 41

[56] References Cited

UNITED STATES PATENTS

| | | | |
|---|---|---|---|
| 3,370,537 | 2/1968 | Tepper | 149/17 X |
| 3,421,954 | 1/1969 | Falconer | 149/17 |
| 3,490,966 | 1/1970 | Hiltz | 149/17 |
| 3,497,404 | 2/1970 | Hiltz | 149/17 |

*Primary Examiner*—Stephen J. Lechert, Jr.
*Attorney*—Paul M. Pahules

[57] ABSTRACT

This invention relates to chemical compounds or composite materials which, when exposed directly to an open flame, give the flame a sustained pre-determined color. Such chemical compounds can be used in a solid, jelly, liquid or gaseous form.

10 Claims, No Drawings

COMPOSITE MATERIALS PRODUCING SUSTAINED COLORED FLAMES

BACKGROUND OF THE INVENTION

The art of pyrotechniques is ages old, and based on the fact that ions of certain metals and a few metalloids, when in the gaseous state produce a colored glow, experimentation with these specific organic and inorganic salts and fuel-base carriers resulted in the following findings.

For the proper fuel base carrier, there must be at least 2 hydrogen atoms for each carbon atom in each molecule; not more than two carbon atoms for each oxygen atom; and no more than 6 nor less than 4 hydrogen atoms for each oxygen atom. Compounds having the above properties burn with a non-luminous or low-luminous flame.

The above requirements permit a reasonable choice of materials available in gaseous, liquid, or solid state. The choice is limited only by the fact that the material must be economical and without danger (non-toxic, non-explosive.)

Methyl alcohol, ethyl alcohol, metaldehyde, ethylene oxide and its polymers, dioxane, ethylacetate, 3-hydroxy 2-butanone and its solid dimer Acetone, 1, 2, dimethoxymethane (dimethyl-acetal), etc. fall within the usable groups.

Isopropanol and all the higher alcohols, acetone and enumerable list of gaseous, liquid, or solid combustibles do not meet the requirements and cannot be used as fuels for colored flames. This includes such higher alcohol as marnitol, sorbitol, etc., which have been suggested as candle fuels, but have not produced satisfactory results.

The flame color producing product can be added either to the wick or to the fuel. Not only inorganic salts or Lithium, LI: NA: BA: K, etc., can be used, but also organic salts or even better, organometallics or metallo-organics. These are compounds in which the metals or metalloids atom is directly linked to carbon, not intermediate atoms such as O. N. S., etc., such material in some carbons or metallic -2-carbon bonds may include both valence and ionic bonds. There is a closing list of metallic organic available offering a wide choice of solubilities in the various compounds as defined by the specifications for materials burning with non-luminous flame. Another important factor is that there is no need to use relatively large quantities of flame coloring materials when the fuel burns with a quiet long luminous flame.

An old qualitative analytical method to detect various elements is the flame color reactions, whereby a characteristic color of the flame may indicate the presence of a certain element. The duration of this reaction, however, is of the magnitude of only seconds and various attempts of using such method, as by impregnating porous alumina blocks or rings with lithium salt, failed to produce favorable results due to this high hygroscopicity of the lithium salt. Further attempts with ceramic and alumina carriers and with alcohol solutions of lithium chloride and copper chloride also failed to produce sustained colored flames. Various pastes of mixed proportions of lithium chloride, lithium fluoride and "Ludox" or pastes made with copper chloride or copper sulfate, and pastes made of silicie acid esters all were met with limited success. Also pastes in which organic cements such as hydroxy ethyl cellulose, vinil cements, etc., were used including oxidizing agents, such as ammonium nitrate, etc., to burn away the carbon as quickly as possible had only fluctuating results.

SUMMARY OF THE INVENTION

The primary object of this invention is to provide composite materials or chemical compounds which produce sustained colored flames and which, when combined with alcohols such as ethanol, methanol, metaldehyde, or other fuel base carriers, form a fuel which when ignited produces sustained colored flames as long as the quantity of fuel lasts. These composite bodies or materials may be in liquid, gaseous, jelly or solid form, which produce economical sustained colored flames and may be used in special devices such as cigarette lighters, torches, candles or the like and the resemblance of such for home, religious observances or ceremonies, for decor of commemorative shrines, and for any other similar decorative devices. These composite bodies may also be used with neutral carriers coated therewith.

In accordance with the present invention, composite bodies or materials are produced by combining metallic salts, such as stannous strontium, lithium and cupric chlorides, ammonium tetraborate and aluminum sulphate, pulverizing and thoroughly blending the resulting mixture, heating the solid mixture until it is reduced to a glossy melt or a liquid state, and cooling the melt to a solid state.

DESCRIPTION OF THE PREFERRED EMBODIMENTS

According to my present invention the foregoing and other difficulties are overcome and composite materials producing sustained colored flames are prepared according to the following ingredients, formulas, ratios or proportions and method of preparation of same.

RED FLAME — FORMULA — Combine 50–60 percent p.p.w. of stannous chloride crystals ($SnCl_2 \cdot 2H_2O$) with 20 percent p.p.w. strontium chloride ($SrCl_2.2H_2O$) and 20 percent p.p.w. of lithium fluoride (LiF) crystals.

BLUE FLAME — FORMULA — Combine 60 percent p.p.w. stannous chloride crystals ($SnCl_2O$) and 40 percent p.p.w. of strontium chloride ($SrCl_2 \cdot 2H_2O$) crystals.

GREEN FLAME — FORMULA — Combine 60 percent ammonium tetra borate ($(NH_4)_2B_4O_7.6H_2O$) with 40 percent cupric chloride ($CuCl_2.2H_2O$) crystals.

The materials or ingredients in each formula above are finely pulverized or powdered and thoroughly blended. The resulting blend or mixture of these materials is then placed in a retaining vessel and is heated to a temperature sufficient to liquify the materials, for example temperatures between 600° to 800° F. The liquified compound or melt is finally allowed to be cooled to a solid state forming a solid composite material or compound. The composite material or compound, when still in liquified state, may be smeared unto wire cloth of stainless steel or any non-corrosive alloy, or unto any compounded plastic preparation which would withstand higher temperature, such as Teflon. In application of the composite material unto the carriers above stated, it is preferred that such carriers be preheated especially the metalic parts thereof. When the coated carrier with the composite material is brought into a flame, the coating compound will burn a brilliant colored flame sustained as long as the material lasts.

The melts producing the various colors stated above are not just physical blends but rather complex chemical compounds because the colors of the melts are different from what could be expected from the materials used in each melt. The temporary flame color reactions are strange. Blue color from aluminum sulfate plus lithium fluoride, orange color from tin chloride plus lithium fluoride, and the melt resulting from tin chloride plus copper chloride does not show the result to be expected from the analogous melt of tin chloride with strontium chloride or with lithium fluoride. However, the ratios can be widely altered, as from about 0.50 percent to 60 percent p.p.w. of one of the metallic salts based on the weight of the fused metallic salts, without much influencing the color or duration of the flame coloration. The specific ratios in the examples above yield satisfactory melt viscosities.

The composite material or compound producing a sustained colored flame may also be used for preparing a liquid fuel by dissolving this composite material in a fuel base carrier such as methyl alcohol, ethyl alcohol, methaldehyde or the like, in the proportions of one part compound to one thousand parts of the fuel base, or in varied proportions determined by the intensity of the sustained colored flame desired.

When these melts of the composite material produced according to the method stated above are cooled, may be formed into pellets which when are mixed with a solution of methanol and/or ethanol, or any diffusive solutions having no carbon molecules, at a ratio of 1:1000 p.p.w., may be subjected to a propellant, such as oxygen, hydrogen or the like, which is readily absorbent with the pellet solution, and be injected into pressurized containers, cartridges, cylinders, or the like, for conveying such gaseous fuel in devices for use as cigarette lighters, candles torches or the like.

The principles, preferred embodiments and mode of operation of the present invention have been described in the foregoing specification, however, it should be understood that the invention which is intended to be protected herein may be practiced otherwise than as described without departing from the appended claims.

What I claim is:

1. A composite material producing a sustained colored flame comprising a solid melt of fused metallic salts consisting of at least two metallic salts in the range of from 0.50 to 60 percent parts by weight of one of said metallic salts, said two metallic salts being selected from the group consisting of halides of tin, strontium, lithium and copper and a fusing material.

2. A composite material, as defined in claim 1, in which said fusing material is selected from the group consisting of ammonium tetraborate and aluminum sulphate and said melt is fused at a temperature from about 600° to 800° F.

3. A composite material, as defined in claim 1, in which said two metallic salts are selected from the group consisting of strontium chloride and lithium fluoride and said fusing material is selected from the group consisting of ammonium tetraborate and aluminum sulphate, and said melt is fused at a temperature from about 600° to 800° F.

4. The composite material as defined in claim 1 wherein the metallic salts are stannous chloride ($SnCl_2 \cdot 2H_2O$) of about 50 to 60 percent per part weight, strontium chloride ($SrCl_2.2H_2O$) of about 20 to 25 percent per part weight, and lithium fluoride (LiF) of about 20 to 25 percent per part weight, whereby said composite material produces a red flame upon ignition.

5. This composite material as defined in claim 1 wherein the metallic salts are stannous chloride ($SnCl_2 \cdot 2H_2O$) of about 60 percent per part weight, and strontium chloride ($SrCl_2 \cdot 2H_2O$) of about 40 percent per part weight, whereby the composite material produces a blue flame upon ignition.

6. The composite material as defined in claim 1 wherein the metallic salts are ammonium tetraborate (($NH_4)_2B_4O_7 \cdot 6H_2O$) of about 60 percent per part weight, and cupric chloride ($CuCl_2.2H_2O$) of about 40 percent per part weight, whereby said composite material produces a green flame upon ignition.

7. The composite material as defined in claim 1 wherein the fused metallic salts are combined with an alcohol fuel base carrier to varied proportions determined by the intensity of the sustained colored flame desired.

8. The composite material as defined in claim 7 wherein the ratio of the fused metallic salts to the alcohol fuel base carrier is 1:1000 per part weight.

9. The composite material as defined in claim 1 wherein the fused metallic salts are dissolved in a solution of alcohols.

10. The composite material as defined in claim 1 wherein the fused metallic salts are dissolved in a solution of alcohols at the ratio of 1:1000 per part weight.

* * * * *